United States Patent
Juarranz Moratilla et al.

(10) Patent No.: US 9,611,962 B2
(45) Date of Patent: Apr. 4, 2017

(54) TONGUE-AND-GROOVE COUPLING BETWEEN PANELS OF SELF-SUPPORTING AIR-CONDITIONING DUCTS

(71) Applicant: Saint-Gobain Cristaleria, S.L., Madrid (ES)

(72) Inventors: Noé Juarranz Moratilla, Madrid (ES); Alfonso Diez Monforte, Madrid (ES); Claire Plateaux, Courbevoie (FR); Gregorio Lopez Belbeze, Madrid (ES)

(73) Assignee: Saint-Gobain Cristaleria, S.L., Madrid (ES)

( * ) Notice: Subject to any disclaimer, the term of this patent is extended or adjusted under 35 U.S.C. 154(b) by 0 days.

(21) Appl. No.: 14/652,115

(22) PCT Filed: Dec. 11, 2013

(86) PCT No.: PCT/ES2013/070866
§ 371 (c)(1),
(2) Date: Jun. 14, 2015

(87) PCT Pub. No.: WO2014/091050
PCT Pub. Date: Jun. 19, 2014

(65) Prior Publication Data
US 2015/0330546 A1    Nov. 19, 2015

(30) Foreign Application Priority Data
Dec. 13, 2012    (ES) ................................ 201231325 U

(51) Int. Cl.
*F16L 11/12*    (2006.01)
*F16L 25/00*    (2006.01)
(Continued)

(52) U.S. Cl.
CPC ........... *F16L 25/0018* (2013.01); *F16L 9/003* (2013.01); *F16L 9/21* (2013.01); *F16L 9/22* (2013.01);
(Continued)

(58) Field of Classification Search
USPC .............................. 285/424, 423, 47, 55, 45
See application file for complete search history.

(56) References Cited

U.S. PATENT DOCUMENTS 3,170,544 A * 2/1965 Kinkead ............... F16L 59/188
                                                        285/305
3,420,142 A    1/1969 Gale et al.
(Continued)

FOREIGN PATENT DOCUMENTS

DE    4433204    3/1996
EP    1528174    3/2014
(Continued)

OTHER PUBLICATIONS

International Search Report and the Written Opinion Dated Mar. 4, 2014 From the Oficina Espanola de Patentes y Marcas Re. Application No. PCT/ES2013/070866 and Its Translation Into English.

*Primary Examiner* — Aaron Dunwoody

(57) ABSTRACT

The invention relates to a tongue-and-groove coupling between panels of self-supporting air-conditioning ducts and the like, of the type that is provided in order to establish an optimum fit of the canted edge corresponding to the panels that are coupled in a tongue-and-groove manner, and also, to avoid the air coming into contact with the core of the duct therein. To this end, the panels consist of a core of insulating material complemented by an outer layer and inner layer based on aluminum or some other coating, the juxtaposing canted edge or edge between the panels having an oblique cut in relation to the horizontality or longitudinal intermediate line in the joint between the two panels; the aluminum
(Continued)

layer or coating, which determines the inner face of the duct, extending beyond the edge of the panel, and being fixed to the oblique surface that defines the coupling profile.

12 Claims, 1 Drawing Sheet

(51) Int. Cl.

| | | |
|---|---|---|
| *F16L 37/08* | (2006.01) | |
| *F24F 13/02* | (2006.01) | |
| *F16L 59/02* | (2006.01) | |
| *F16L 59/08* | (2006.01) | |
| *F16L 59/14* | (2006.01) | |
| *F16L 9/00* | (2006.01) | |
| *F16L 9/21* | (2006.01) | |
| *F16L 9/22* | (2006.01) | |

(52) U.S. Cl.
CPC ............ *F16L 37/08* (2013.01); *F16L 59/026* (2013.01); *F16L 59/028* (2013.01); *F16L 59/08* (2013.01); *F16L 59/143* (2013.01); *F24F 13/0209* (2013.01)

(56) References Cited

U.S. PATENT DOCUMENTS

| | | | | |
|---|---|---|---|---|
| 3,474,834 A * | 10/1969 | Carey | ........................ | F16L 9/00 |
| | | | | 138/140 |
| 3,885,595 A * | 5/1975 | Gibson | .................. | F16L 59/188 |
| | | | | 138/155 |
| 4,538,834 A * | 9/1985 | Brady | ...................... | F16L 59/16 |
| | | | | 285/10 |
| 4,660,861 A * | 4/1987 | Argy | ...................... | F16L 59/029 |
| | | | | 138/149 |
| 5,971,440 A * | 10/1999 | Boatman | ................. | F16L 21/02 |
| | | | | 285/230 |
| 6,328,501 B1 * | 12/2001 | Gimbert | ................ | E21D 11/083 |
| | | | | 285/293.1 |
| 6,533,326 B1 * | 3/2003 | Socier | ................... | F16L 41/021 |
| | | | | 285/133.11 |
| 2004/0137181 A1 | 7/2004 | Ruid et al. | | |

FOREIGN PATENT DOCUMENTS

| | | |
|---|---|---|
| ES | 2243119 | 11/2005 |
| ES | 1075439 | 10/2011 |
| WO | WO 2014/091050 | 5/2014 |

* cited by examiner

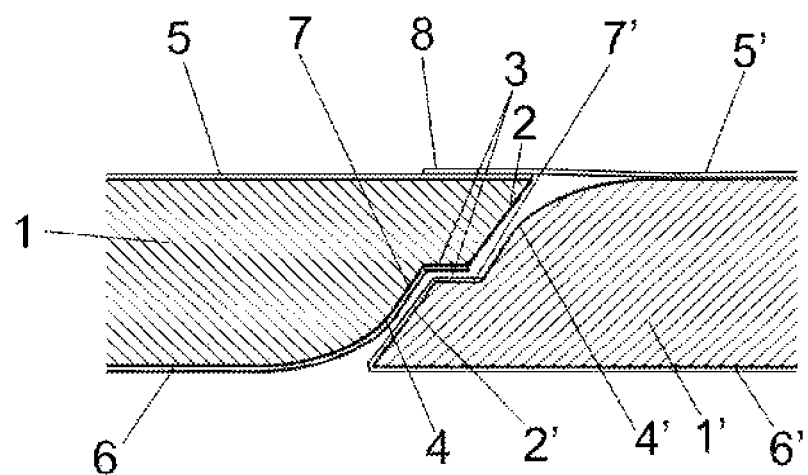

TONGUE-AND-GROOVE COUPLING BETWEEN PANELS OF SELF-SUPPORTING AIR-CONDITIONING DUCTS

RELATED APPLICATIONS

This application is a National Phase of PCT Patent Application No. PCT/ES2013/070866 having International filing date of Dec. 11, 2013, which claims the benefit of priority of Spanish Patent Application No. U201231325 filed on Dec. 13, 2012. The contents of the above applications are all incorporated by reference as if fully set forth herein in their entirety.

OBJECT OF THE INVENTION

The invention relates to a tongue-and-groove coupling between panels of self-supporting air-conditioning ducts and the like, of the type that is provided in order to establish an optimum fit of the canted edge corresponding to the panels that are coupled in a tongue-and-groove manner, intended to form self-supporting air-conditioning ducts or for other applications.

The aim of the invention is to obtain, besides an optimum coupling, to avoid the air coming into contact with the core of the duct therein, with the subsequent risk that particles of the insulating material, which form part of the panels, detach themselves towards the inside of the duct, during the mechanical cleaning operations or the duct arrangement.

BACKGROUND OF THE INVENTION

In the scope of practical application of the invention, i.e., that of the panels used for forming self-supporting air-conditioning ducts, the ducts preferably embodied in mineral wool, are well known, wherein the panels forming the duct are coupled in a tongue-and-groove manner establishing a canted edge in said coupling.

Theoretically, the coupling in a tongue-and-groove manner is carried out by means of perpendicular cuts between the two panels to be joined, which perpendicular cuts have been made relative to the longitudinal line of the panels' intersection.

Nevertheless, in reality, there are problems with the tongue-and-groove adjustment, caused by the curvatures resulting from the molding process, which make the surface to have cavities and irregularities at the joints of the different modules of the final duct.

With the aim of solving this problem, the applicant himself is the holder of the utility model U201100838, in which a coupling in a tongue-and-groove manner between this type of panels is described, wherein the coupling and juxtaposing canted edged or edge of both panels, has an oblique cut relative to the horizontality or the longitudinal intermediate line in the joint between the two panels.

While this structure achieves a much effective intermodules coupling, this solution poses a problem, i.e., given the coupling arrangement, it is possible that particles from the mineral wool core of the panel get detached in the event of mechanical cleaning or maintenance operations, falling towards the inside of the duct and being swept by the air flow.

SUMMARY OF THE INVENTION

The recommended coupling based on the aforementioned structure, offers a completely satisfactory solution to the problem set out above, preventing the entry of particles from the insulating core inside the duct formed by the panels themselves.

To this end, in a more specific manner, the panels of the invention are made up from a core of insulating material, which is supplemented on both external faces thereof with one aluminum layer or coating each, forming a "sandwich" type structure, having in their coupling edges a cut oblique to said edge, forming a sort of staggered coupling in a tongue-and-groove manner, with the special particularity that the aluminum layer or coating, which determines the inner face of the duct, extends beyond the edge of the panel, being fixed to the oblique surface that defines the coupling.

In this way, this aluminum layer or another coating is superimposed upon the tongue-and-groove coupling with the coating layer of the adjacent panel, perfectly insulated inside the duct against eventual detachments of the particles from the insulating core caused by mechanical cleaning or maintenance operations and in addition providing the edge with a higher mechanical resistance, since as the border adopts an acute angle shape it becomes considerably more fragile.

Given the oblique character of the tongue-and-groove profile, the same does not make necessary for the extensions of the coating layers of the inner faces of the panel to reach the end of said profile, although it is possible to adopt this solution without affecting the essence of the invention.

Optionally, one of the aluminum layers making up the outer layer of the panels may extend slightly in the longitudinal direction, such that the same overlaps the edge of the outer face of the adjacent panel, thus guaranteeing the sealing.

BRIEF DESCRIPTION OF THE SEVERAL VIEWS OF THE DRAWINGS

In order to complement the description being made below and with the aim of facilitating a better understanding of the invention characteristics, according to a preferred and practical exemplary embodiment thereof, a single plane is attached as an integral part thereof, in which by way of non-limiting example the following has been represented:

FIG. 1—Shows a sectional leveled view of the coupling in a tongue-and-groove manner between panels of air-ducts, realized according to the object of the present invention.

DESCRIPTION OF SPECIFIC EMBODIMENTS OF THE INVENTION

As can be observed in the referred FIGURE, the coupling in a tongue-and-groove manner between two panels (1, 1') intended to form a self-supporting air-conditioning duct or similar, has a similar arrangement to that of the aforementioned utility model U201100838, in which the canted edge or edge corresponding to these panels (1, 1'), has an oblique cut (2, 2'), respectively, that defines a sort of oblique staggering with a straight and longitudinal length (3) of both panels (1, 1'), such that this oblique cut (2, 2') achieves the establishment of an optimal adjustment in the tongue-and-groove coupling, thus solving the problem caused by the curvatures (4, 4') of the panels (1, 1') when the corresponding molding process is carried out, both panels (1-1') being assisted by an outer coating layer (5-5') and an inner coating layer (6-6') conveniently adhered to the main core of the insulating material, and forming a sandwich-type structure, being it possible nevertheless, to embody this layers in Kraft-Aluminum, reinforced woven fiberglass fabric, veil made of acrylic glass or similar, without this affecting the essence of the invention.

Well then, now according to the invention, it has been foreseen that the aluminum inner layer or coating (6-6') extends through end sectors (7-7') beyond the panel edge, being fixed to the oblique surface that defines the coupling.

Although in FIG. 1 this end sectors (7-7') only extend up to the intermediate area of said coupling, this solution corresponds to the optimum solution, insofar, it enables avoiding the detachment of particles from the insulating material towards the inside of the duct in the event of cleaning or maintenance operations, although, the end sectors (7-7') could extend along the entire edge that defines the coupling, without this affecting the essence of the invention.

In order to achieve a better sealing in the coupling between panels, the upper aluminum sheet (5') of the panel (1') may extend along a short length (8), that remains free, intended to overlap the upper aluminum layer (5), as shown in FIG. 1.

What is claimed is:

1. A self-supporting air duct, comprising:
panels coupled by tongue-and-groove coupling along a longitudinal joint line between two panels, wherein the panels are made up from a core panel of insulating material supplemented with both an outer coating layer and an inner coating layer, and each panel has a respective coupling profile with a canted edge, the panels being juxtaposed with a joint line parallel to the canted edge with the respective canted edges of the panels facing each other, and wherein the canted edges have an oblique surface cut from a horizontal surface of the core, wherein the coating layer, which determines the inner face of the duct, extends beyond the edge of the panel, being fixed to at least a portion of the oblique cut surface that defines the coupling profile, wherein the panels are planar having two horizontal parallel surfaces.

2. A panel for self-supporting air-conditioning ducts, comprising: a core panel of insulating material with two horizontal surfaces of the core supplemented on each horizontal surface with both an outer coating layer and an inner coating layer, wherein a first longitudinal edge of the panel has a coupling edge profile, for tongue-and-groove coupling with another panel, wherein the longitudinal edge is formed by making an oblique cut in the insulating core from a first horizontal surface, the coating layer, which covers the first horizontal surface that determines the inner face of the duct, extends beyond the edge of the panel and is fixed to at least a portion of the oblique surface that defines the first coupling profile, wherein the panel is planar having two horizontal parallel surfaces.

3. A panel according to claim 2, wherein the coupling profile defines an oblique staggering with a straight and longitudinal portion parallel to the horizontal surfaces of the panel.

4. A panel according to claim 3, wherein the straight and longitudinal portion parallel to the horizontal surfaces of the panel is also covered by the coating layer.

5. A panel according to claim 2, wherein the coupling profile has a curved portion from the other horizontal surface to said straight longitudinal portion parallel to the horizontal surfaces of the panel.

6. A panel according to claim 5, wherein the curved portion is not covered by the coating layer.

7. A panel according to claim 6, wherein the outer layer of the panel has a free-standing portion extending along a short length over the curved portion of the edge, and which overlaps the upper aluminum layer of another coupled panel.

8. A panel according to claim 2, wherein the second longitudinal edge has a coupling edge profile, wherein a longitudinal canted edge is formed by making an oblique cut in the insulating core relative to the from the other horizontal surface, and the coating layer, which covers the other horizontal surface that determines the outer face of the duct, does not extend beyond the cut edge of the panel.

9. A panel according to claim 8, wherein the second coupling profile defines an oblique staggering with a straight and longitudinal portion parallel to the horizontal surfaces of the panel and a curved portion from the first horizontal surface to said straight longitudinal portion, wherein the straight and longitudinal portion parallel to the horizontal surfaces of the panel is also covered by the coating layer covering the first horizontal surface.

10. A panel according to claim 2, wherein the outer coating layer and the inner coating layer are made out of a material selected from the group consisting of: aluminum, Kraft-Aluminum, reinforced woven fiberglass fabric, and veil made of acrylic glass.

11. A self-supporting air duct according to claim 1, wherein the outer coating layer and the inner coating layer are made out of a material selected from the group consisting of: aluminum, Kraft-Aluminum, reinforced woven fiberglass fabric, and veil made of acrylic glass.

12. A self-supporting air duct according to claim 1, wherein the core panel of insulating material includes mineral wool.

* * * * *